Sept. 12, 1950      J. MARTIN      2,522,457
CARTRIDGE FEEDING MECHANISM FOR AUTOMATIC CANNON
Filed May 23, 1947      7 Sheets-Sheet 3
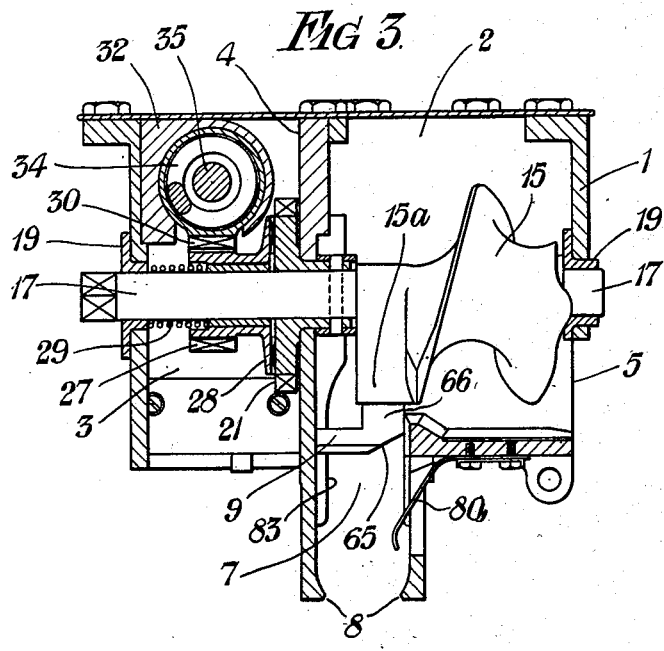
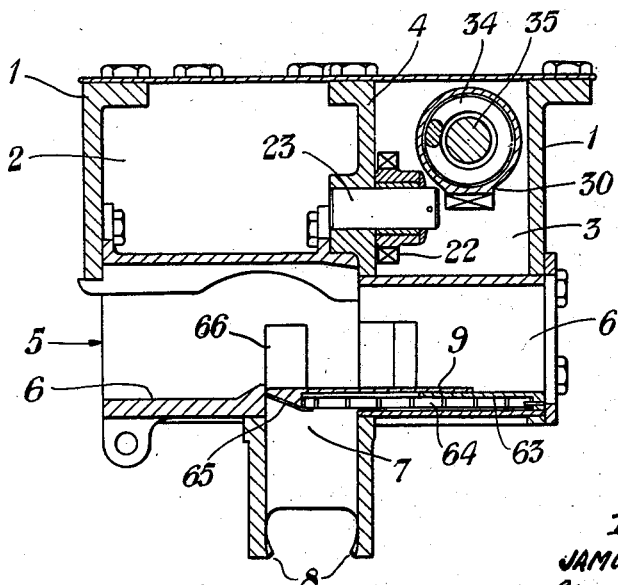
INVENTOR.
JAMES MARTIN
per Worth Wade
ATTORNEY.

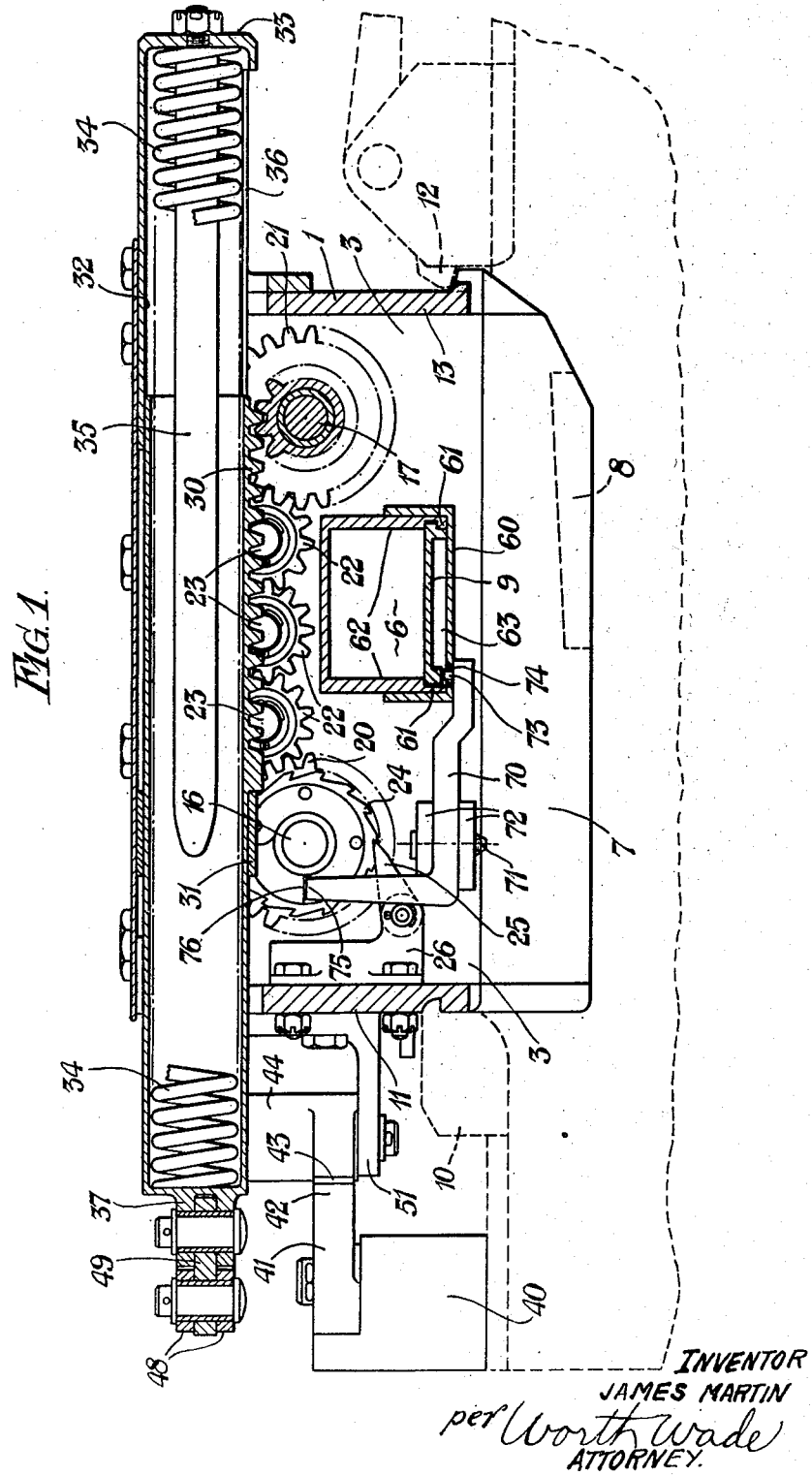

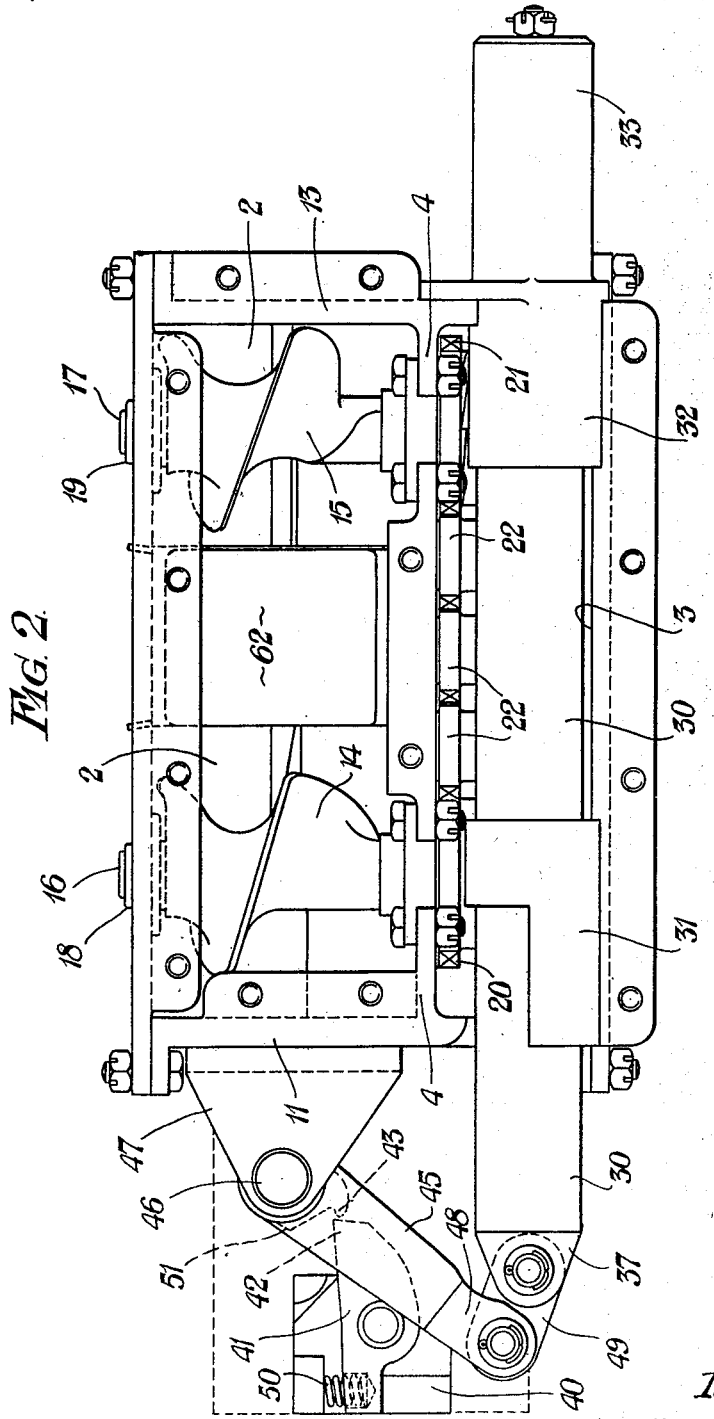

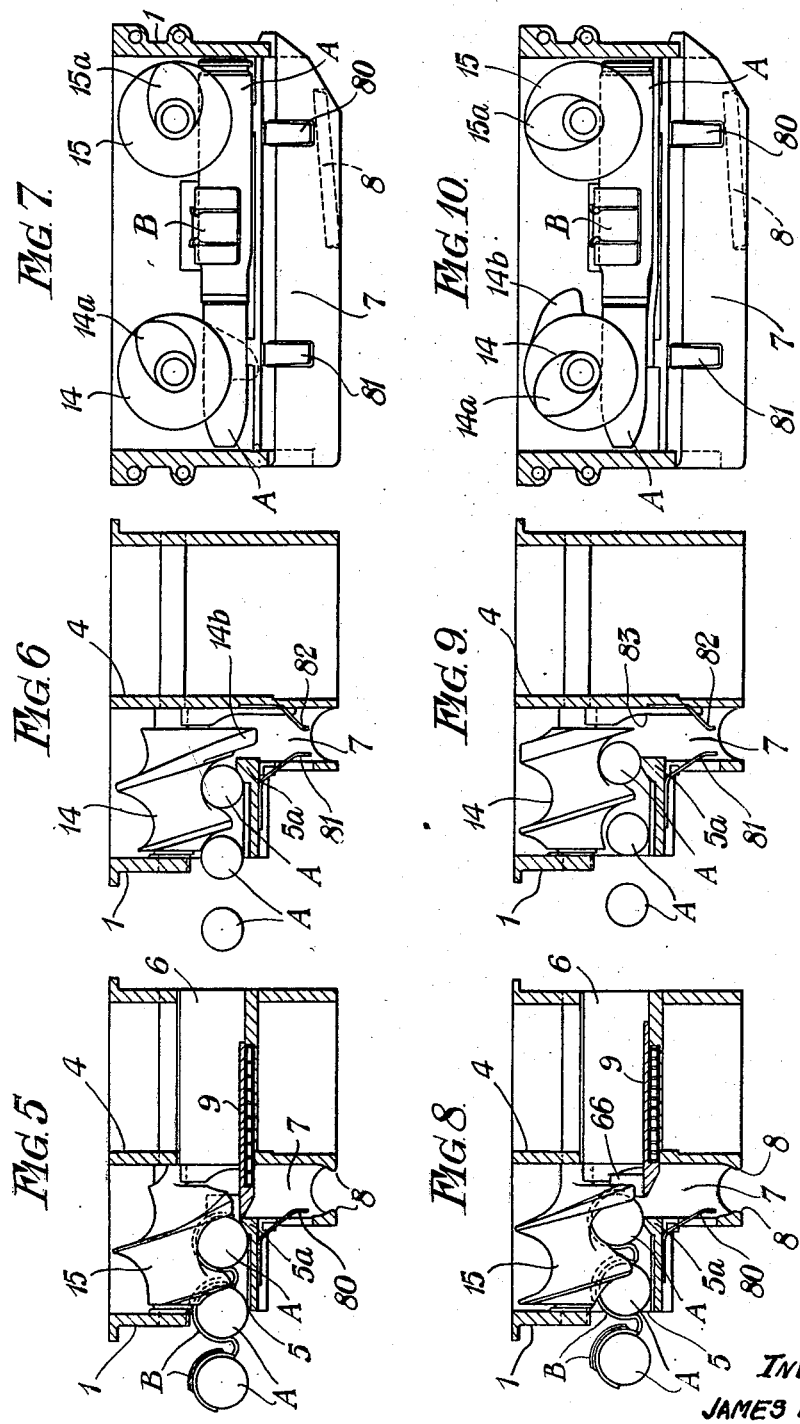

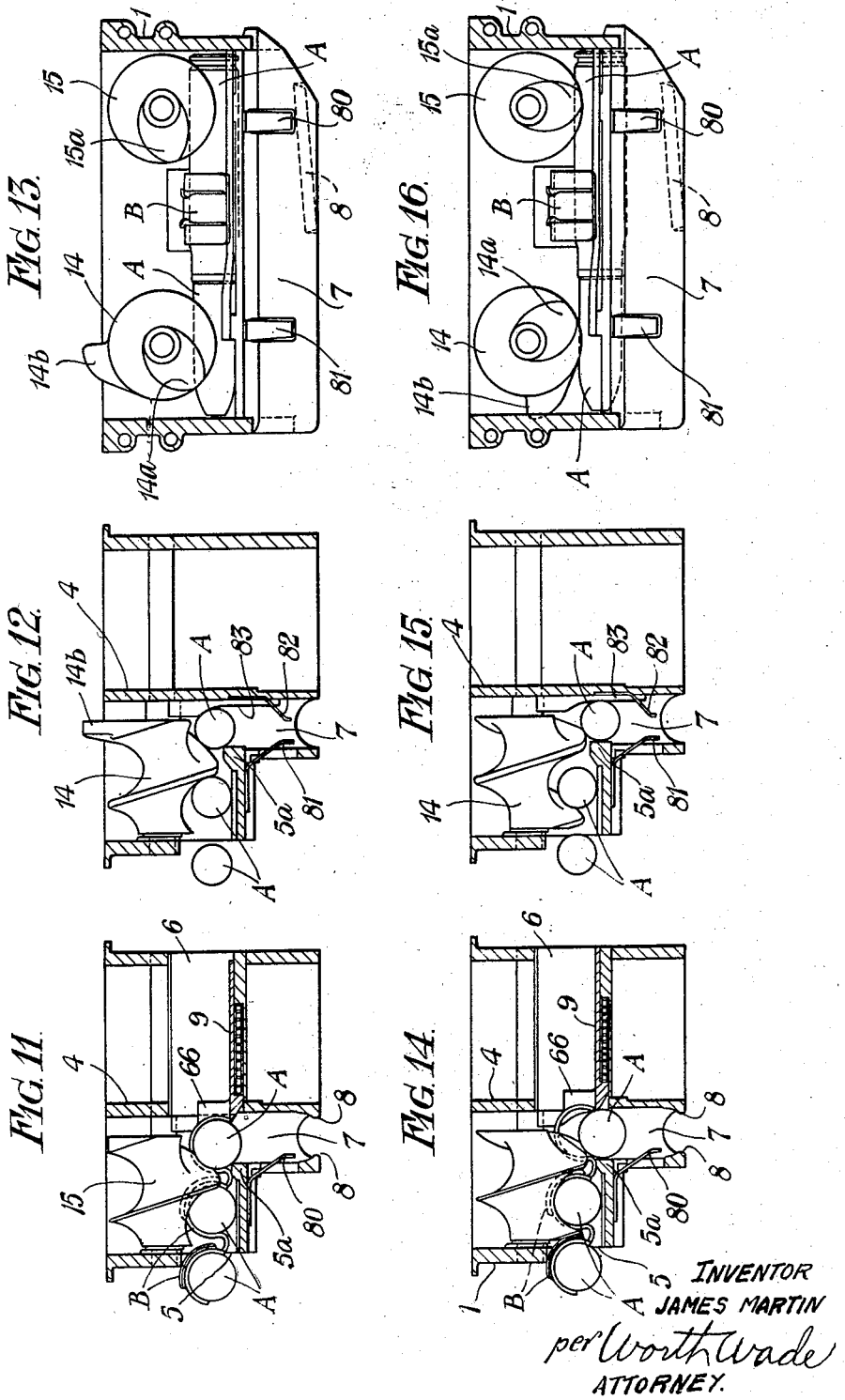

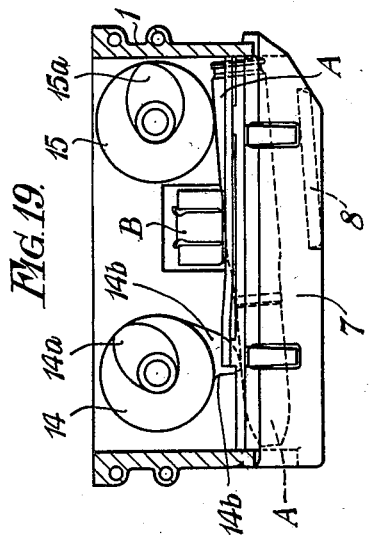
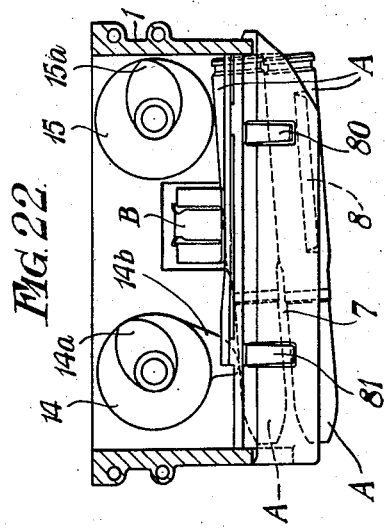
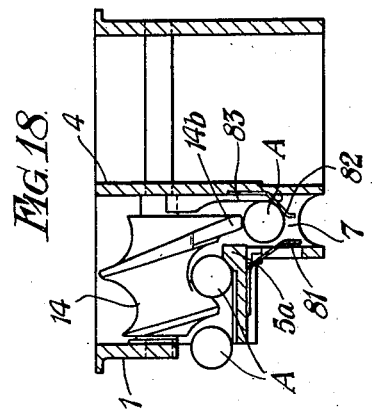
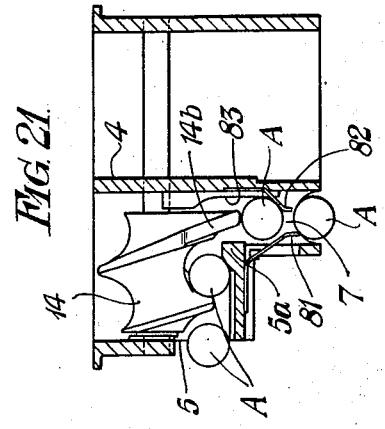
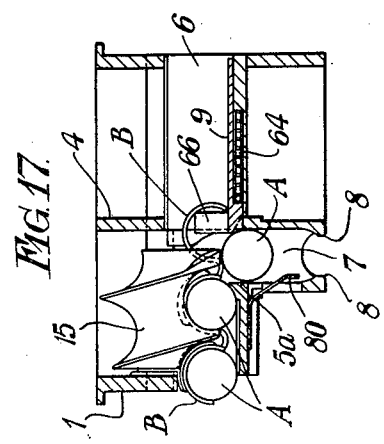
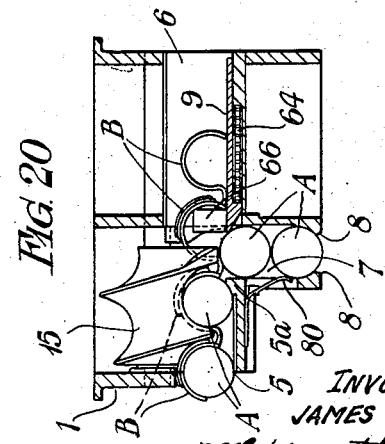

Sept. 12, 1950 J. MARTIN 2,522,457
CARTRIDGE FEEDING MECHANISM FOR AUTOMATIC CANNON
Filed May 23, 1947 7 Sheets-Sheet 7
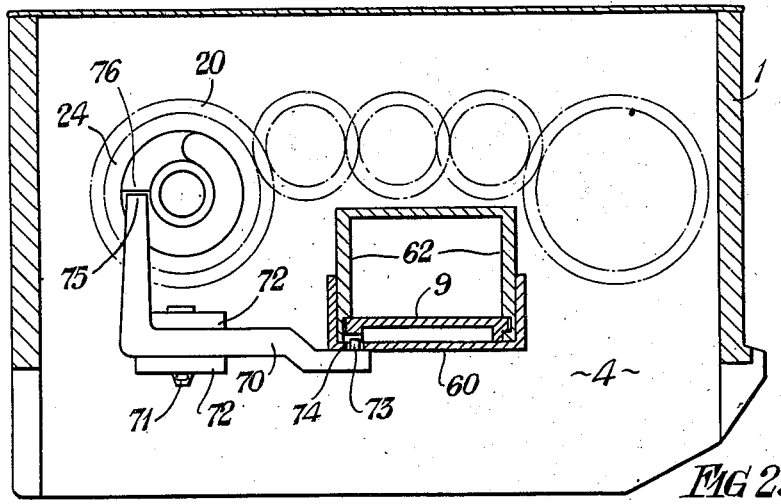
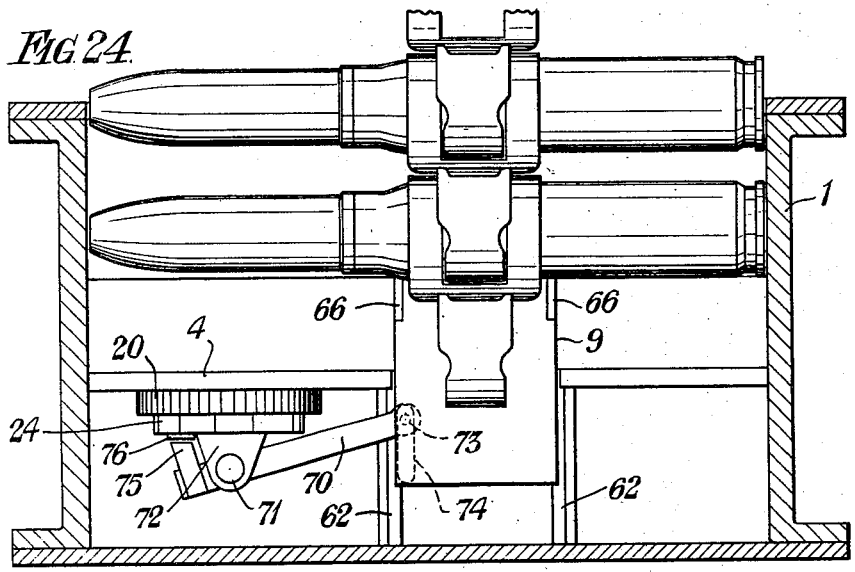
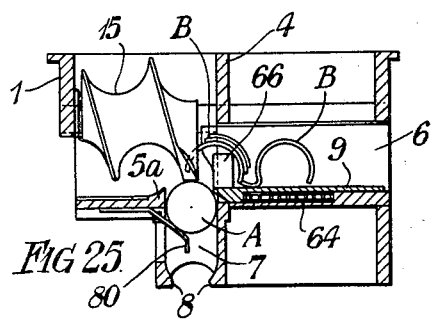
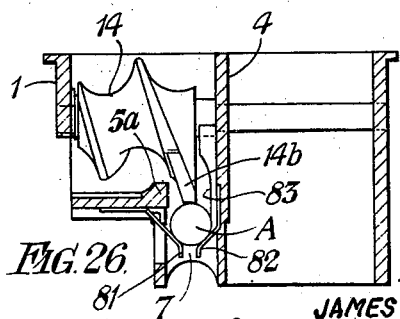
INVENTOR
JAMES MARTIN
per Worth Wade
ATTORNEY.

Patented Sept. 12, 1950

2,522,457

UNITED STATES PATENT OFFICE 2,522,457

CARTRIDGE FEEDING MECHANISM FOR AUTOMATIC CANNON

James Martin, Higher Denham, near Uxbridge, England

Application May 23, 1947, Serial No. 749,913
In Great Britain May 23, 1946

12 Claims. (Cl. 89—33)

This invention relates to the feeding of ammunition to automatic cannon, machine guns and the like particularly when the ammunition in the form of cartridges is connected by a series of links to form a belt with the cartridges disposed transversely to the length thereof and arranged so that the belt may be fed step by step into position for separating each cartridge from the belt in turn and for loading it into the gun as required.

The object of this invention is to provide a feed mechanism which will be reliable in operation and readily adaptable to different conditions and positions of operation, which will be of low overall height and exert a high average pull on the ammunition belt. It is suitable for use in the wings of aeroplanes and other restricted spaces where it is usually necessary with existing types of feed mechanism to provide a bulge or excrescence into which part of the mechanism projects and which frequently spoils the smooth contour of the wing and detracts from the aerodynamic efficiency thereof. The present invention avoids this.

According to this invention the ammunition formed into a belt by interconnecting links between adjacent cartridges, is fed automatically in unison with the firing movements of the gun by means of rotatable scroll members acting on the cartridges to feed the belt step by step transversely to the axis of the gun and to separate individual cartridges from the belt in turn and to position each in succession in the correct position to be loaded into the gun as required.

In carrying the invention into practice the reciprocating motion of the gun is transmitted to the feed mechanism through means for converting the reciprocating to rotary motion and acts to rotate feed scrolls for feeding the cartridges to a position for loading into the gun breech. For this purpose the gun or a moving part thereof actuates a rack embodying a shock absorbing or spring cushion device. The rack engages a pinion which acts through a train of gears and a one way drive device to rotate helical scroll members disposed transversely across the axis of the cartridges and which act to delink each cartridge in turn from the feed belt and to move it into position for loading into the breech of the gun.

In order that the invention may be more readily understood, a practical application thereof suitable for use with an automatic cannon (such as the 20 mm. Hispano cannon) will now be described with reference to the accompanying drawings in which:

Fig. 1 is a part sectional side elevation of an ammunition feed box suitable for mounting in the wing of an aeroplane in association with an automatic cannon of the Hispano 20 mm. type.

Fig. 2 is a plan view of the above with the cover removed.

Fig. 3 is a cross-sectional view taken on the axis of the rear feed scroll.

Fig. 4 is a cross-sectional view through the cartridge link platform and link ejector opening.

Figs. 5 and 6 are cross-sectional views showing the rear and front scrolls, and

Fig. 7 is a longitudinal section showing both scrolls and illustrating one stage in the feeding of a series of cartridges to the feed lips of the box for insertion in the gun breech.

Figs. 8, 9 and 10, Figs. 11, 12 and 13, Figs. 14, 15 and 16, Figs. 17, 18 and 19, Figs. 20, 21 and 22 are similar views to Figs. 5, 6 and 7 showing successive stages in the feeding of cartridges to the gun breech.

Figs. 23 and 24 are part sectional end views and plan showing details of a scroll stop device to prevent overfeeding, and Figs. 25 and 26 are sectional detail views showing last round retaining springs.

In the practical application of the invention illustrated in the drawings and referring more particularly to Figs. 1 to 4, the feed mechanism may be constructed as an independent unit in a separate casing 1 adapted to be mounted on the magazine carrier of the gun and anchored to a rigid part of the wing structure. The casing 1 may conveniently be divided into two parts 2 and 3 by longitudinal dividing wall 4 and in one part 2 is provided the feed scrolls and associated parts for feeding the cartridges and in the other part 3 is located the actuating mechanism.

The casing 1 is provided with an intake opening 5 on one side into which the foremost end of the ammunition belt is inserted and through which the belt will be drawn by the feed mechanism. At the other side is provided a discharge opening 6 leading to a chute for the ejection of the belt links and extending transversely across the casing is a support for the ammunition with a gap therein forming a feed mouth 7 through which each cartridge is fed to the feed lips 8 as it is separated from the belt and from which it is loaded into the gun by the mechanism of the gun itself. On the support is mounted a slidable link platform 9 which may be utilised to control a safety stop to prevent overfeeding of the ammunition to the feed mouth 7 and which will be described in detail with reference to Figs. 23 and 24.

The casing 1 is mounted on the standard magazine carrier of the gun and is located between the fixed abutment 10 which engages its front wall 11 and the magazine catch lever 12 which engages its rear wall 13 and secures it on the magazine carrier so that the feed mouth 7 and feed lips 8 are correctly positioned to support each cartridge in turn, ready for insertion in the breech of the gun. The magazine carrier is held stationary whilst the gun is free to move beneath it under the recoil action when the gun is fired. This relative movement is utilised to actuate the feed mechanism and to feed each cartridge into the breech of the gun, in turn.

Front and rear scrolls 14 and 15 are arranged transversely across the casing 1 with extension shafts 16 and 17 passing through bearings in the dividing wall 4 and their ends are also supported in bearings 18 and 19 in the side walls of the casing. The shaft 17 is provided with a squared end to receive a tool by which it may be rotated by hand to rotate the scrolls 15 for the initial operation of feeding in the end of the ammunition belt when "loading." The scroll shafts 16 and 17 are provided with toothed gears 20 and 21 secured in driving engagement thereon. The two gears 20 and 21 are geared together by intermediate idler gears 22 mounted on shafts 23 fixed in the dividing wall 4 (see Figs. 1 and 4). The pitch of these gears is arranged so that the scrolls do not get out of phase and their angular relation to one another is therefore maintained. The gear 20 on the shaft 16 of the front scroll 14 is provided with a ratchet 24 with which engages a pawl 25 pivotally supported in a bracket 26 secured to the front wall 11 of the casing and this ensures that the gears 20, 21 and 22 and the scrolls 14 and 15 can only rotate in one direction. The shaft 17 of the rear scroll 15 has a toothed pinion 27 mounted freely thereon and carried by this pinion is a one-way driving ratchet 28 which engages with corresponding ratchet teeth on the face of the gear 21 and is held in engagement therewith by the spring 29.

The two scrolls 14 and 15 which are geared together by their gears 20 and 21 and the idler gears 22 have a step by step rotary movement imparted to them by the reciprocating movement of a toothed rack 30, the teeth of which gear with the pinion 27 on the shaft 17 of the rear scroll 15. This rack 30 is of hollow cylindrical form and is mounted to slide endwise in the guides 31 and 32 fixed in the casing 1. The rearmost guide 32 projects from the casing and is closed at its end 33 to form an abutment for the strong buffer spring 34 which is located within the hollow rack 30 and is adapted to be compressed between it and the closed end 33 of the guide 32. An inner guide rod 35 is fixed in the abutment 33 and engages in the buffer spring 34 to ensure smooth action and prevent buckling of the spring. The rear guide 32 is slotted at 36 on its underside to allow the teeth of the rack 30 to project through to engage the teeth of the pinion 27.

Reciprocating motion is imparted to the rack 30 by the recoil movement of the gun when it is fired. For this purpose the bracket 40 is mounted on the gun body and slides to and fro with it, whilst the casing 1 of the feed mechanism is mounted on the magazine carrier of the gun and is held stationary by suitable connections securing it to a fixed portion of the structure on which the gun is mounted. On the bracket 40 is pivotally mounted the sear 41 the end 42 of which is adapted to engage with the "bent" 43 on the boss 44 of the rack lever 45. This rack lever 45 is pivoted at 46 to the bracket 47 on the front wall 11 of the casing 1 and the outer forked end 48 of the lever 45 is connected by a link 49 to the forked end 37 of the rack 30. A spring 50 acts on the tail of the sear 41 so as to enable its end 42 to ride over the "bent" 43 on its return stroke. The end 42 of the sear 41 may be arranged to over-ride the "bent" 43 owing to the arcuate movement of the latter but if desired the nose 51 on the "bent" 43 will act to positively disengage the end 42 of the sear 41 from the "bent" 43 after a predetermined movement of the rack lever 45. This ensures effective operation of the feed mechanism by a relatively small portion of the recoil movement of the gun and also prevents damage to the feed mechanism by any excess of recoil movement. The buffer spring 34 in the hollow rack 30 returns the rack to its forward position after each recoil movement of the gun. The reciprocating movement of the rack acts through the one-way driving ratchet 28 to impart a step by step movement to the scrolls 14 and 15. It is preferred that the actual driving force shall be effected by the return movement of the rack 30 under the influence of its spring 34 as this tends to exert a smooth and resilient force for feeding the ammunition to the gun.

Located between the two scrolls 14 and 15 and slidably mounted in discharge opening 6 is the link ejector platform 9 which slides transversely over the base 60 in guides 61 in the housing 62. The link ejector platform 9 is recessed on this underside 63 to accommodate a spring 64 which comprises a flat strip of spring steel bent into a zig-zag form so as to fit in the shallow space available beneath the link ejector platform 9. This spring 64 tends to force the link ejector platform 9 toward the intake opening 5 and over the feed mouth 7. The forward end of the link ejector platform is bevelled at 65 on its underside and a pair of upstanding tabs 66 are arranged at one each side of the forward end of the link ejector platform 9 to be engaged by the foremost cartridge of the incoming belt of ammunition. These tabs 66 are spaced apart a sufficient distance to enable the belt links B which connect the cartridges A into belt form to pass between them. In order to enter the feed mouth 7 each cartridge A must push back the link ejector platform 9 by engaging against its upstanding tabs 66 and after the cartridge has entered the feed mouth 7 the spring 64 urges the link ejector platform 9 over the feed mouth so that its bevelled end 65 engages the cartridge in the feed mouth. The space in the feed mouth above the feed lips 8 is sufficient to accommodate two cartridges, one above the other. The bevelled end 65 of the link ejector platform 9 engages the uppermost cartridge pressing it down onto the lower cartridge on the feed lips 8 so that the latter is held firmly in the correct position to be fed into the gun breech by the breech block. In this position the link ejector platform 9 will be held back from the position shown in Fig. 4. This is utilised to control a safety stop to prevent a third cartridge being forced into the feed mouth 7 when there are already two cartridges in position. For this purpose a stop lever 70 is pivoted at 71 between the brackets 72 on the dividing wall 4 of the casing 1, (see Figs. 23 and 24). The end of the lever 70 has a pin 73 which projects up through an opening 74 in the base 60 of the housing 62 and engages in a recess in the underside of the link ejector platform 9. When there are already two cartridges in the feed mouth 7 as shown in Fig. 20, the link ejector platform 9 will be held back by the upper cartridge so that the stop lever 70 will be turned about its pivot 71 and its upper end 75 will be moved into the path of the scroll stop 76 on the face of the ratchet wheel 24 affixed to the gear 20 of the front scroll 14. This will prevent the feeding of further cartridges to the feed mouth 7 until the lower cartridge has been removed from the feed lips 8 and inserted in the breech of the gun by the breech block. The upper cartridge may then descend and the link ejector platform 9 moves back under the influence of its spring and turns the lever 70 about its pivot 71 so as to withdraw its end 75 from the path of the scroll stop 76 thus enabling the feeding operations to continue.

A further safety device consists in providing retaining springs in the feed mouth 7 past which each cartridge A must be pressed down onto the feed lips 8 by the cartridge above it. These retaining springs may be three in number and are shown as flat blade springs 80 which engage one side of the cartridge case and two flat blade springs 81 and 82 which engage one at each side of the shell end of the cartridge. A guide 83 is also provided on one side of the feed mouth 7 against which the shell portion of the cartridges may engage. This assists to keep the cartridges in alignment in the centre of the feed mouth 7 to ensure correct loading of each cartridge into the breech of the gun. Figs. 25 and 26 show how the retaining springs 80, 81 and 82 act to hold up the last cartridge in a belt of ammunition. As there is no following cartridge to press it down past the retaining springs, it will be held up on the springs as shown and cannot be jammed or damaged by the breech block of the gun as might happen if it were allowed to rest loosely on the feed lips 8. These retaining springs 80, 81 and 82 also act to hold the lower cartridge firmly on the feed lips 8 in the correct position and attitude ready for loading into the gun breech by the breech block.

The operation of the ammunition feed mechanism is illustrated in the series of diagrammatic views Figs. 5, 6 and 7 to Figs. 20, 21 and 22 and is as follows:

The leading end of a belt of ammunition consisting of a series of cartridges A interconnected by belt links B is inserted into the inlet opening 5 and the scrolls 14 and 15 are rotated by hand by a suitable armourer's tool fitted on the squared end of the scroll shaft 17. The foremost cartridge A is engaged by the scrolls 14 and 15 and the belt is drawn into the position shown in Figs. 5, 6 and 7. The next stage is shown in Figs. 8, 9 and 10 in which further rotation of the scrolls 14 and 15 has drawn the leading cartridge A along the inlet 5 and on to the ridge 5a toward the feed mouth 7 and the cartridge has engaged the tabs 66 and is pressing back the link ejector platform. In Figs. 11, 12 and 13 the leading cartridge A has pressed back the link ejector platform 9 and is over the entry to the feed mouth 7. In Figs. 14, 15 and 16, cam portions 14a and 15a of the scrolls 14 and 15 have pressed the foremost cartridge A down into the feed mouth 7 and out of the belt link B thus performing a delinking operation; the link B being supported by the ridge 5a and the end of the link ejector platform 9. In Figs. 17, 18 and 19 the foremost cartridge A has entered fully into the feed mouth 7 and its forward or shell end has been depressed by the cam 14b on the feed scroll 14. The link B is moving onto the link ejector platform 9, the bevelled end 65 of which is being pressed by its spring 64 against the cartridge A so as to press it down into the feed mouth 7. In Figs. 20, 21 and 22, the feed mechanism has completed a further cycle and a second cartridge A has been fed into the feed mouth 7 and has pressed the first cartridge down onto the feed lips 8 where it is supported in the correct position with its shell end inclined downwardly ready to be loaded into the breech of the gun. For this purpose, the gun is "cocked" by the cocking mechanism which forms part of the normal gun installation and the breech block is held back by its sear. The gun is then ready for firing and on operating the firing control, the breech block is released and sweeps forward carrying the lowermost cartridge A into the breech of the gun. The breech is thus closed, the breech block locked and the cartridge is fired by the firing pin striking the cap in the base of the cartridge. The recoil of the gun acting through the rack 30, spring 34, pinion 17, gears 20, 21 and 22 and the one-way driving ratchet 28 will rotate the feed scrolls 14 and 15 to feed another cartridge A into the feed mouth 7. The cycle of operations will continue as long as the firing control is operated. When the firing control is released, the breech block will be held back by its sear and the gun will cease firing. In case the feed mechanism should continue to operate under the inertia of its parts or because the spring 34 is compressed, the lever 70 and scroll stop 76 will act to avoid overfeeding and will prevent a third cartridge being fed to the feed mouth 7 if there are already two cartridges in position therein. The retaining springs 80, 81 and 82 will act to retain the last cartridge of a belt of cartridges in the upper part of the feed mouth 7 so that it cannot be damaged by the breech block or become jammed or accidentally fed into the gun breech.

I claim:

1. In a mechanism for feeding elongate cartridges to an automatic cannon having a breech and a recoil mechanism, the combination of, a pair of spaced helical scrolls adapted to engage spaced points adjacent each end of an elongate cartridge, said scrolls being mounted above the breech of the cannon to feed cartridges transversely into a position in which they are aligned with the breech, a toothed rack arranged and positioned to be reciprocated by the recoil mechanism of the cannon, gears arranged and positioned between said rack and said scrolls to translate the reciprocating movement of said rack into rotatory movement of said scrolls, and a downwardly-directed cartridge feed mouth positioned at the delivery end of said scrolls to receive cartridges from said scrolls and position them for insertion in the breech of the cannon.

2. A cartridge feeding mechanism as recited in claim 1 in which each of said scrolls is provided with a cam portion at the delivery end for forcing a cartridge downwardly in said feed mouth.

3. A cartridge feeding mechanism as recited in claim 1 in which said scrolls are geared together for synchronous movement in phase.

4. A cartridge feeding mechanism as recited in claim 1 in which the feed mouth is provided with resilient means for supporting the leading cartridge in said mouth.

5. In mechanism for feeding ammunition to automatic cannon, a casing having an inlet opening for a series of cartridges formed into a belt by connecting links, a downwardly directed feed mouth for the cartridges and a discharge outlet for the belt links; two feed scrolls adapted to engage the front and rear ends of each cartridge, a cam portion on each feed scroll to press each cartridge down into the feed mouth, and recoil actuated operating means comprising a slidable rack with a buffer return spring and a one-way ratchet drive to impart a step by step rotary movement to the feed scrolls.

6. In mechanism for feeding ammunition to automatic cannon according to claim 5, a safety stop to prevent further operation of the feed scrolls when there are already two cartridges in position in the feed mouth.

7. In mechanism for feeding ammunition to automatic cannon according to claim 5, retaining springs for holding back the last cartridge of a belt of ammunition so that it will be supported in the feed mouth and cannot be damaged or fed to the breech by the mechanism of the gun.

8. In mechanism for feeding ammunition to automatic cannon, a casing having an inlet opening for a series of cartridges formed into a belt by connecting links, a downwardly directed feed mouth for the cartridges and a discharge outlet for the belt links; two feed scrolls adapted to engage the front and rear ends of each cartridge, a cam portion on each feed scroll to press each cartridge down into the feed mouth and recoil actuated operating means comprising a slidable rack with a buffer return spring and a one-way ratchet drive to impart a step by step rotary movement to the feed scrolls and toothed gearing interconnecting the feed scrolls in constant angular relation and a ratchet and pawl to prevent reverse rotation of the feed scrolls.

9. In mechanism for feeding ammunition to automatic cannon, a casing having an inlet opening for a series of cartridges formed into a belt by connecting links, a downwardly directed feed mouth for the cartridges and a discharge outlet for the belt links; two feed scrolls adapted to engage the front and rear ends of each cartridge, a cam portion on each feed scroll to press each cartridge down into the feed mouth, a spring actuated link ejector platform slidable over the feed mouth and adapted to be pressed back by each cartridge entering the feed mouth and recoil actuated operating means comprising a slidable rack with a buffer return spring and a one-way ratchet drive to impart a step by step rotary movement to the feed scrolls.

10. In mechanism for feeding ammunition to automatic cannon according to claim 9 a scroll stop mounted on one of the scroll shafts, a lever pivoted to the casing and adapted to be actuated by the slidable link ejector platform to intercept the scroll stop to prevent the feeding of further cartridges to the feed mouth when there is already a predetermined number of cartridges in the feed mouth.

11. In mechanism for feeding ammunition to automatic cannon, a casing having an inlet for a series of cartridges formed into a belt by connecting links, a downwardly directed feed mouth for the cartridges and a discharge outlet for the belt links; two feed scrolls adapted to engage the front and rear ends of each cartridge, a cam portion on each feed scroll to press each cartridge down into the feed mouth, a spring actuated link ejector platform slidable over the feed mouth and adapted to be pressed back by each cartridge entering the feed mouth and toothed gear interconnecting the feed scrolls in constant angular relation and a ratchet and pawl to prevent reverse rotation of the feed scrolls.

12. In mechanism for feeding ammunition to automatic cannon; a casing to be held in stationary relationship to the gun mounting, helical feed scrolls rotatably mounted in bearings in the casing, a toothed pinion freely mounted on the shaft of one feed scroll, a toothed rack gearing with the pinion and slidably mounted in guides in the casing, means for transmitting the recoil movements of the gun to the slidable rack, a one-way driving device between the pinion and the feed scrolls and means for supporting the leading cartridge in position for insertion in the gun breech by the mechanism of the gun.

JAMES MARTIN.

REFERENCES CITED

The following references are of record in the file of this patent:

UNITED STATES PATENTS

| Number | Name | Date |
|---|---|---|
| 1,413,694 | Vollmer | Apr. 25, 1922 |
| 2,047,596 | Romberg | July 14, 1936 |
| 2,397,501 | Meyer | Apr. 2, 1946 |

FOREIGN PATENTS

| Number | Country | Date |
|---|---|---|
| 308,574 | Germany | June 6, 1922 |
| 452,606 | Germany | Nov. 14, 1927 |
| 498,946 | Germany | May 31, 1930 |
| 871,833 | France | Jan. 22, 1942 |